(12) United States Patent
Singh (10) Patent No.: US 12,192,233 B2
(45) Date of Patent: Jan. 7, 2025

(54) SYSTEMS AND METHODS FOR PHISHING ATTACK PROTECTION BASED ON IDENTITY PROVIDER VERIFICATION

(71) Applicant: Citrix Systems, Inc., Ft. Lauderdale, FL (US)

(72) Inventor: Manbinder Pal Singh, Coral Springs, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 753 days.

(21) Appl. No.: 17/231,618

(22) Filed: Apr. 15, 2021

(65) Prior Publication Data

US 2022/0337625 A1 Oct. 20, 2022

(51) Int. Cl.
H04L 29/06 (2006.01)
G06N 3/04 (2023.01)
G06N 3/08 (2023.01)
H04L 9/40 (2022.01)

(52) U.S. Cl.
CPC .......... *H04L 63/1483* (2013.01); *G06N 3/04* (2013.01); *G06N 3/08* (2013.01)

(58) Field of Classification Search
CPC ........ H04L 63/1483; G06N 3/04; G06N 3/08; G06F 21/55; G06F 2221/2119
See application file for complete search history.

(56) References Cited

U.S. PATENT DOCUMENTS

| 8,220,047 | B1 | 7/2012 | Soghoian et al. |
| 9,736,147 | B1 | 8/2017 | Mead |
| 11,356,481 | B1 * | 6/2022 | Singh ................ H04L 63/1483 |
| 11,997,135 | B2 | 5/2024 | Wing |
| 2007/0006305 | A1 | 1/2007 | Florencio et al. |
| 2007/0199054 | A1 | 8/2007 | Florencio et al. |

(Continued)

FOREIGN PATENT DOCUMENTS

| EP | 2348442 | | 7/2011 |
| WO | 2020110109 | A1 | 6/2020 |
| WO | 2021056230 | A1 | 4/2021 |

OTHER PUBLICATIONS

Adebowale M.A. et al., "Intelligent Phishing Detection Scheme Using Deep Learning Algorithms", retrieved from the Internet: https://arro.anglia.ac.uk/id/eprint/705509/1/Adebowale_2020.pdf [copy retrieved Apr. 8, 2021], 22 pages.

(Continued)

*Primary Examiner* — Baotran N To (57) ABSTRACT

A computer system is provided. The computer system includes a memory and at least one processor coupled to the memory and configured to provide phishing attack protection based on identity provider verification. The at least one processor is further configured to capture an image of a browser web page to which the user has navigated and identify the domain name associated with the browser web page. The at least one processor is further configured to determine that the captured image matches an image of a known identity provider web page. The at least one processor is further configured to detect a phishing attempt in response to the determination that the images match and that the domain name associated with the browser web page differs from the domain name associated with the identity provider web page.

12 Claims, 6 Drawing Sheets

(56) References Cited

U.S. PATENT DOCUMENTS

| | | | |
|---|---|---|---|
| 2008/0098464 | A1 | 4/2008 | Mizrah |
| 2009/0063462 | A1 | 3/2009 | Alfonseca |
| 2016/0253492 | A1 | 9/2016 | Chougle |
| 2019/0014149 | A1* | 1/2019 | Cleveland ............. G06N 3/045 |
| 2019/0173921 | A1 | 6/2019 | Dicorpo et al. |
| 2020/0137110 | A1 | 4/2020 | Tyler et al. |
| 2021/0092155 | A1 | 3/2021 | Wang et al. |
| 2021/0344711 | A1* | 11/2021 | Cleveland ............. H04L 9/3236 |
| 2022/0030029 | A1* | 1/2022 | Kagan ..................... G06N 3/08 |
| 2023/0121470 | A1* | 4/2023 | Singh ................. H04L 63/1483 |
| | | | 726/22 |

OTHER PUBLICATIONS

International Search Report mailed Jun. 23, 2020 for International Patent Application No. PCT/CN2019/107676, 4 pages.

Written Opinion mailed Jun. 23, 2020 for International Patent Application No. PCT/CN2019/107676, 4 pages.

How to check the security state of an XMLHTTPRequest over SSL, downloaded from https://developer.mozilla.org/en-US/docs/Web/API/XMLHttpRequest/How_to_check_the_secruity_state_of_an_XMLHTTPRequest_over_SSL, downloaded Nov. 15, 2019, 9 pages.

International Search Report and Written Submission mailed Apr. 25, 2022 for International Application No. PCT/US2022/013791 (10 pages).

International Search Report and Written Submission mailed Mar. 25, 2022 for International Application No. DCT/US2021/064914 (7 pages).

\* cited by examiner

SYSTEMS AND METHODS FOR PHISHING ATTACK PROTECTION BASED ON IDENTITY PROVIDER VERIFICATION

BACKGROUND

Cyber security is an issue of great importance, as attacks on computer systems and the users of those systems continue to increase. One of the most prevalent, and often most successful, forms of attack is known as the "phishing attack," in which the user is tricked into willingly providing credentials, such as login passwords, to a bad actor or hacker. This can occur under various scenarios. For example, the user may be directed to the hacker's website which is disguised as a legitimate website, and which asks the user to login using his credentials. Many other examples are possible.

SUMMARY

In at least one example, a computer system is provided. The computer system includes a memory; and at least one processor coupled to the memory and configured to: capture an image of a browser web page; identify a domain name associated with the browser web page; determine an image match where the captured image matches an image of an identity provider (IdP) web page; and detect a phishing attempt in response to the determination of the image match, if the domain name associated with the browser web page differs from a domain name associated with the IdP web page.

At least some examples of the computer system can include one or more of the following features. The at least one processor is further configured to employ a neural network to determine the image match. The at least one processor is further configured to train the neural network, the training comprising: navigating to the IdP web page based on the domain name associated with the IdP web page; capturing an image of the IdP web page; generating variations of the image of the IdP web page; and employing the variations to train the neural network. The variations are generated by modifying attributes of the image of the IdP, the attributes including one or more of a background color, logos, fonts, dimensions, languages, words, or phrases. The domain name associated with the IdP web page is obtained from a datastore of IdP web pages, the datastore configured by an administrator. The at least one processor is further configured to bypass the detection of the phishing attempt in response to a determination that the browser web page is not a sign-in page. The at least one processor is further configured to perform a security action in response to the detected phishing attempt, the security action including one or more of providing a warning to a device associated with a user who navigated to the browser web page, logging the detection, and generating an alert to an administrator.

In at least one example, a method for protection of user credentials is provided. The method includes capturing, by a computer system, an image of a browser web page; identifying, by the computer system, a first domain name associated with the browser web page; determining, by the computer system, that the captured image matches an image of an identity provider (IdP) web page; determining, by the computer system, that the first domain name differs from a second domain name, the second domain name associated with the IdP web page; and detecting, by the computer system, a phishing attempt in response to the determination that the captured image matches the image of the IdP web page and the determination that the first domain name differs from the second domain name.

At least some examples of the method can include one or more of the following features. The act of employing a neural network to determine that the captured image matches the image of the IdP web page. The act of navigating to the IdP web page based on the second domain name; capturing an image of the IdP web page; generating variations of the image of the IdP web page; and employing the variations to train the neural network. The variations are generated by modifying attributes of the image of the IdP, the attributes including one or more of a background color, logos, fonts, dimensions, languages, words, or phrases. The second domain name is obtained from a datastore of IdP web pages, the datastore configured by an administrator. The act of bypassing the detection of the phishing attempt in response to a determination that the browser web page is not a sign-in page. The act of performing a security action in response to the detected phishing attempt, the security action including one or more of providing a warning to a device associated with a user who navigated to the browser web page, logging the detection, and generating an alert to an administrator.

In at least one example, a non-transitory computer readable medium storing executable sequences of instructions to provide protection of user credentials is provided. The sequences of instructions include instructions to: capture an image of a browser web page; identify a domain name associated with the browser web page; determine an image match where the captured image matches an image of an identity provider (IdP) web page; and detect a phishing attempt in response to the determination of the image match, if the domain name associated with the browser web page differs from a domain name associated with the IdP web page.

At least some examples of the non-transitory computer readable medium can include one or more of the following features. Instructions to employ a neural network to determine the image match. Instructions to navigate to the IdP web page based on the domain name associated with the IdP web page; capture an image of the IdP web page; generate variations of the image of the IdP web page; and employ the variations to train the neural network. The variations are generated by modifying attributes of the image of the IdP, the attributes including one or more of a background color, logos, fonts, dimensions, languages, words, or phrases. The domain name associated with the IdP web page is obtained from a datastore of IdP web pages, the datastore configured by an administrator. Instructions to bypass the detection of the phishing attempt in response to a determination that the browser web page is not a sign-in page. Instructions to perform a security action in response to the detected phishing attempt, the security action including one or more of providing a warning to a device associated with a user who navigated to the browser web page, logging the detection, and generating an alert to an administrator.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As noted previously, cyber security is a growing concern as attacks on computer systems and the users of those systems increase. Phishing attacks, in particular, pose a serious problem. In one example of a phishing attack, the user visits a website that is believed to be legitimate and is fooled into entering his credentials (e.g., a password) on an input form of the website. It can often be difficult or impossible for the user to recognize a nefarious website, and so urging users to be diligent is generally not an effective solution to this problem. Likewise, maintaining a blacklist of websites that are known to be dangerous is not effective, as such a list would require constant updates and can never be complete.

To address these and other problems, and as summarized above, various examples described herein are directed to systems and methods for protection against phishing attacks that can lead to theft of user credentials. In some examples, the disclosed techniques are implemented, at least in part, by a web browser plug-in or extension.

In some examples, the disclosed techniques provide protection against phishing attacks by verifying the legitimacy of an identity provider (IdP). IdPs are third party entities that provide user authentication services to client organizations. These organizations (e.g., companies, enterprises, etc.) use the services of the IdPs to manage user access to the websites and applications that are offered by the organization. For example, an IdP manages and maintains user credentials on behalf of an organization and presents a user with a sign-in page, such as the one illustrated in FIG. 2, described below, which typically asks for a username and password, to be verified prior to granting access to a resource of the organization. The phishing protection system disclosed herein verifies that a sign-in page, to which a user has navigated, is being presented by a legitimate or known IdP as opposed to a phishing website that is attempting to capture the user's credentials.

In some examples, the verification is accomplished by capturing a screen image or screenshot of the webpage to which the user has navigated. The screen image is provided to a neural network based computer vision (CV) image analyzer that is trained to recognize whether or not the captured image matches the webpage of any known and/or trusted IdPs. If the screen image of the webpage is recognized as a known IdP, then the domain name associated with that webpage should match the known domain name associated with that IdP. If the domain names do not match, then the webpage to which the user has navigated is likely a phishing attack webpage. In such case, the user can be alerted, or other appropriate action can be taken to prevent a malicious website from obtaining the user's credentials. An alert may ask the user to confirm whether or not they wish to proceed. Other actions can include notifying information technology (IT) administration, logging the event for later analysis, and/or forcing a password change.

For example, a malicious phishing web site can duplicate a sign-in web page of an IdP, either exactly or with some variations. A user is then lured to the malicious web site, through an email link or by other such means. The appearance of the malicious web site is similar enough to the genuine IdP provided sign-in web site so that the user is fooled. Additionally, the user does not notice that the domain name of the malicious web site differs, perhaps only slightly, from the true IdP domain name. As such, the user enters their credentials which are then stolen. The phishing protection system, however, recognizes that the malicious web site is similar to a genuine IdP sign-in web site and further detects that the domain name of the malicious web site differs from the true IdP domain name associated with the genuine IdP. The phishing protection system can therefore take appropriate action including blocking the user from entering credentials.

In some examples, the disclosed techniques include training of the neural network. A data set of training images is generated by navigating to the sign-in web page of a known IdP and capturing the screen image of that page. A relatively large number of variations of that captured screen image can then be generated by varying selected attributes of the page, such as colors, fonts, logos, dimensions, etc. The neural network can then be trained to recognize the IdP sign-in page based on the training images using any desired training technique in light of the present disclosure. The process can be repeated for other IdPs to develop training images for each IdP of interest to the organization, and the neural network can be trained to recognize these additional IdP sign-in pages. An administrator can create and maintain a datastore of such IdPs to include the uniform resource locators (URLs) and domain names of the IdPs.

These systems and methods overcome a number of security problems. For example, a user may navigate to a website that is unknown to the user, and the website may ask the user to enter their password. This request may provide a plausible reason for this request and appear to be legitimate. The disclosed techniques will warn or prevent the user from entering a password and divulging credentials.

As yet another example, a user may attempt to navigate to a legitimate website but get redirected to a phishing website that closely resembles the legitimate website. Here again, the phishing website may ask the user to enter their password in a compellingly plausible matter, and the disclosed techniques will prevent or discourage the user from doing so.

Thus, and in accordance with at least some examples disclosed herein, systems and methods for securing user passwords from detection by a phishing attack are provided. These systems and methods provide for detection and blocking of attempts by a user to enter their password to a phishing website.

As will be understood in view of this disclosure, the systems and methods for providing protection against theft of user credentials by phishing websites provided herein have several advantages over existing methods which rely on user vigilance, which is subject to lapse, or blacklisted websites, which require constant updates and can never be complete. For instance, the systems and methods described herein provide automated protection and do not rely on user action.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Password Protection System

Figure 1:
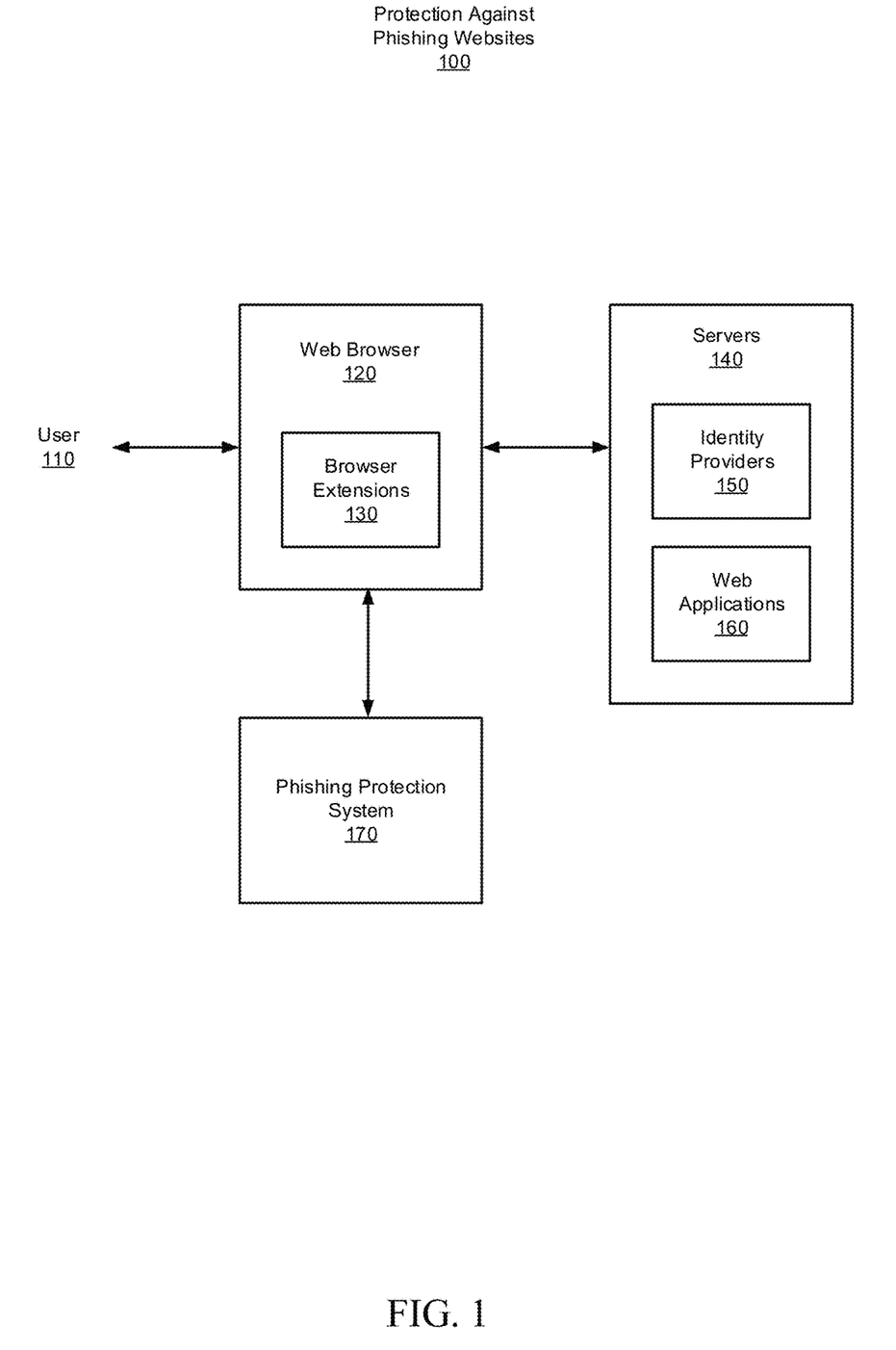
FIG. 1 is a top-level block diagram of an implementation of a system for providing protection against phishing attacks, in accordance with an example of the present disclosure.

FIG. 1 is a top-level block diagram 100 of an implementation of a system 170 for providing protection against phishing attacks, in accordance with an example of the present disclosure. As shown in FIG. 1, the system comprises a web browser 120, which may include browser extensions 130, and a phishing protection system 170.

The web browser 120 is configured to enable the user 110 to navigate to servers 140 and the websites and web applications 160 hosted on those servers. The operation of phishing protection system 170 will be explained in greater detail below, but at a high-level, the system 170 is configured to monitor user browsing activity to detect that the user has navigated to a web page that resembles a known IdP sign-in web page and then verify that the domain name of the web page is legitimate (e.g., matches the known domain name for that IdP). If the domain name does not match, then an attempted phishing attack is detected, and appropriate security measures can be taken. These measures may include alerting the user, obtaining confirmation of trust from the user, and alerting IT security/administration.

Figure 2:
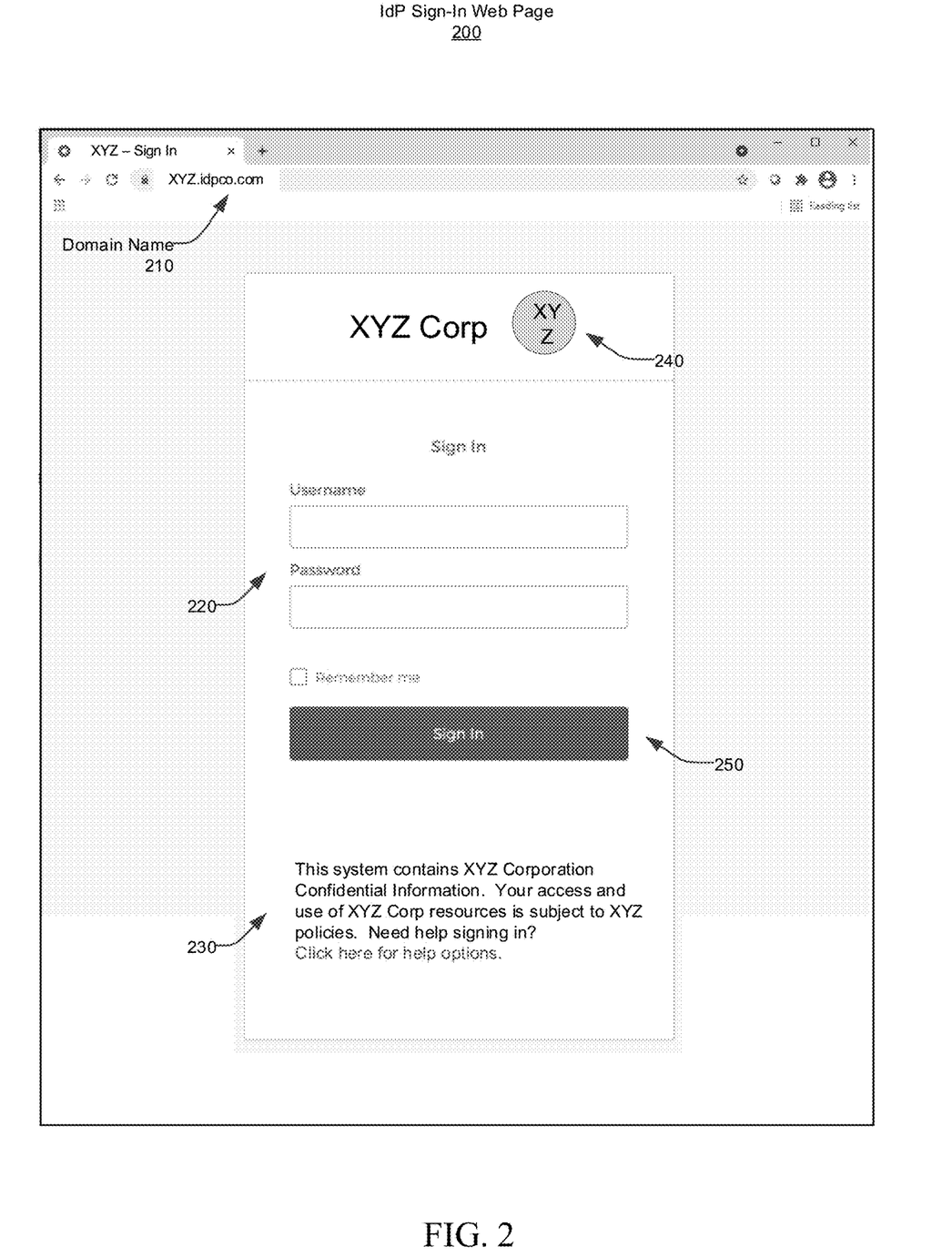
FIG. 2 illustrates an identity provider sign-in web page, in accordance with an example of the present disclosure.

FIG. 2 illustrates an identity provider sign-in (or logon) web page 200, in accordance with an example of the present disclosure. The sign-in page is for a company named XYZ Corporation, in this example. The domain name 210 for the IdP provider for this company is "XYZ.idpco.com" which is associated with an IdP company called "IdPCo," in this example. Username and password entry fields 220 are also shown, along with a text block 230, a sign-in button 250, and a company logo 240. The domain name "XYZ.idpco.com," in this example is the genuine domain name for the IdP. A malicious phishing web page can present the same image (or a slight variation) to fool the user into believing the page is genuine, but the phishing web page would necessarily have a different domain name. For example, the phishing web page may use the domain name "XYZ.idpcco.com" (with an extra 'c') instead of "XYZ.idpco.com," which would be easy for the user to overlook.

Figure 3:
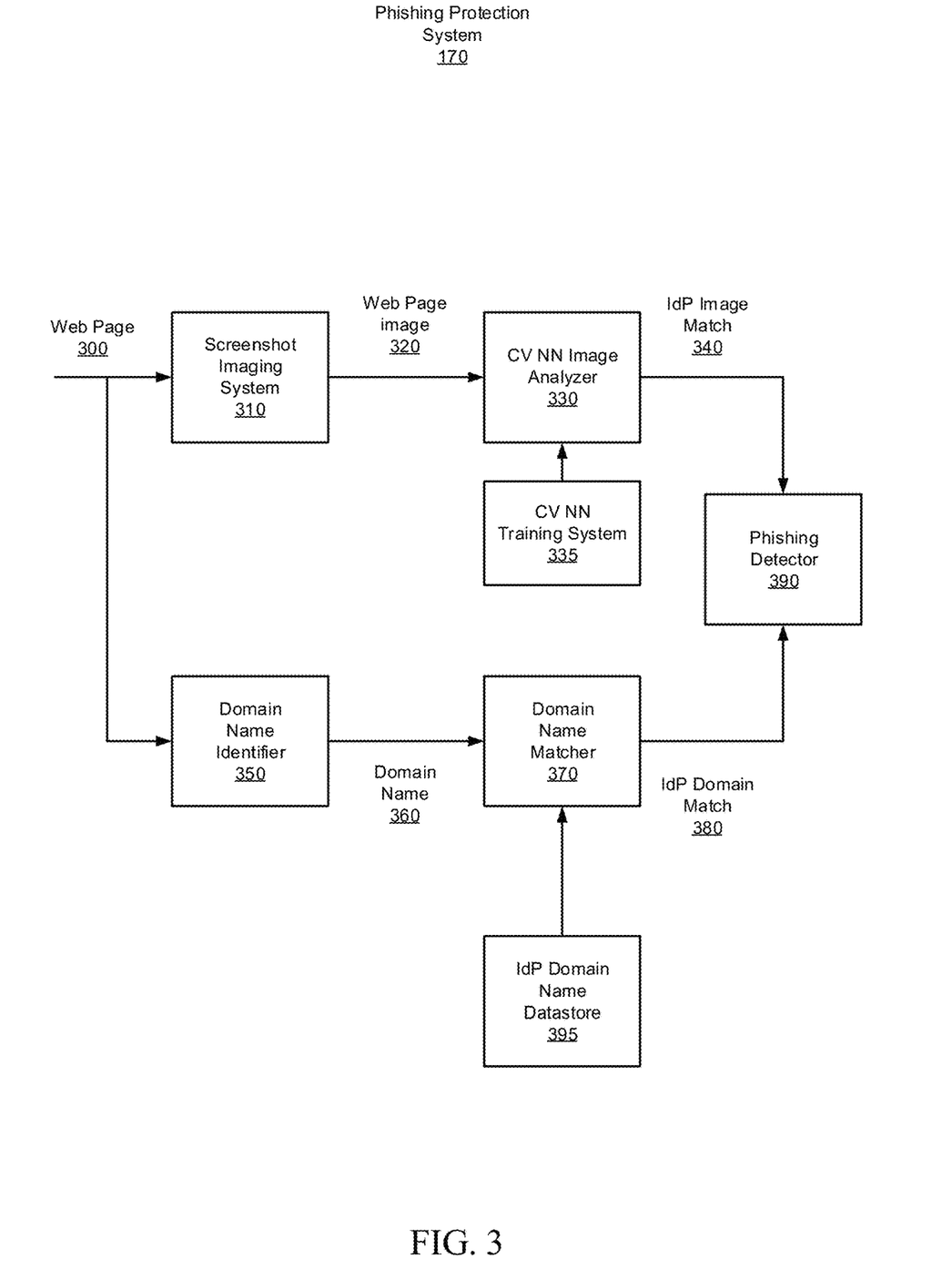
FIG. 3 is a block diagram of a phishing attack protection system, in accordance with an example of the present disclosure.

FIG. 3 is a block diagram of a phishing attack protection system 170, of FIG. 1, in accordance with an example of the present disclosure. The phishing attack protection system 170 is shown to include a screenshot imaging system 310, a CV neural network image analyzer 330, a CV neural network training system 335, a domain name identifier 350, a domain name matcher 370, an IdP domain name datastore 395, and a phishing detector 390.

The screenshot imaging system 310 is configured to capture an image 320 of a browser web page 300, for example a web page to which the user has navigated. The image can then be used by the CV neural network image analyzer 330 for matching/classification purposes, as described below. The screenshot imaging system 310 may also be used to capture images of administrator added IdP web pages for training of the CV neural network image analyzer 330, as described below.

The CV neural network image analyzer 330 is configured to determine that the captured image 320 matches an image of an IdP web page. The determination of a match 340 may be based on a selected degree of similarity which involves a tradeoff between match detection probability and false alarm rate. For example, requiring an exact match may result in missed match detections, while allowing more flexible similarity may result in false alarms. In some examples this can be determined during the neural network training process. In some examples, the determination of a match 340 can be classifying a web page image 320 to be of a specific IdP domain or to be undefined/unclassified. Any suitable CV analyzer or machine learning technique may be used, in light of the present disclosure. Some examples include TensorFlow and PyTorch which employ machine learning models based on deep neural networks.

The domain name identifier 350 is configured to identify a domain name 360 associated with the browser web page 300. In some examples, the domain name can be obtained through optical character recognition of the URL address bar of the browser window which contains the domain name. In some examples, the domain name can be obtained using a javascript (e.g., document.URL) executing within the browser, for example through a browser extension or plugin.

The domain name matcher 370 is configured to determine that the identified domain name associated with the browser web page matches 380 the domain name associated with the IdP web page. The domain name associated with the IdP web page may be obtained, for example, from the IdP domain name datastore 395 which is configured by a system administrator to store information (including domain names) related to known IdPs (e.g., IdPs of interest to the enterprise seeking protection from phishing attacks).

The phishing detector 390 is configured to detect a phishing attempt in response to the determination of an image match 340 in conjunction with the determination that the domain name associated with the browser web page 360 differs from the domain name associated with the IdP web page (i.e., that the IdP domain match 380 is false). In some examples, the phishing detector 390 is configured to perform a security action in response to the detected phishing attempt. The security action may include warning a user that navigated to the browser web page, logging the detection, and/or generating an alert to an administrator.

In some examples, the browser web page is first analyzed to determine if the page is a sign-in or logon page, for example by detection of a username and/or password entry field, and if the page is not a sign-in page, the phishing detection process is bypassed.

The CV neural network training system 335 is configured to train the CV neural network image analyzer 330, as described below in greater detail in connection with FIG. 4.

Password Protection Process

As described above, some examples of the system 170 of FIG. 1 are configured to perform a process for providing protection against phishing attacks. The processes may be executed on a processor of any suitable type (e.g., processor 610 of FIG. 6). The processes may further be implemented through execution of a web browser plug-in or extension.

Figure 4:
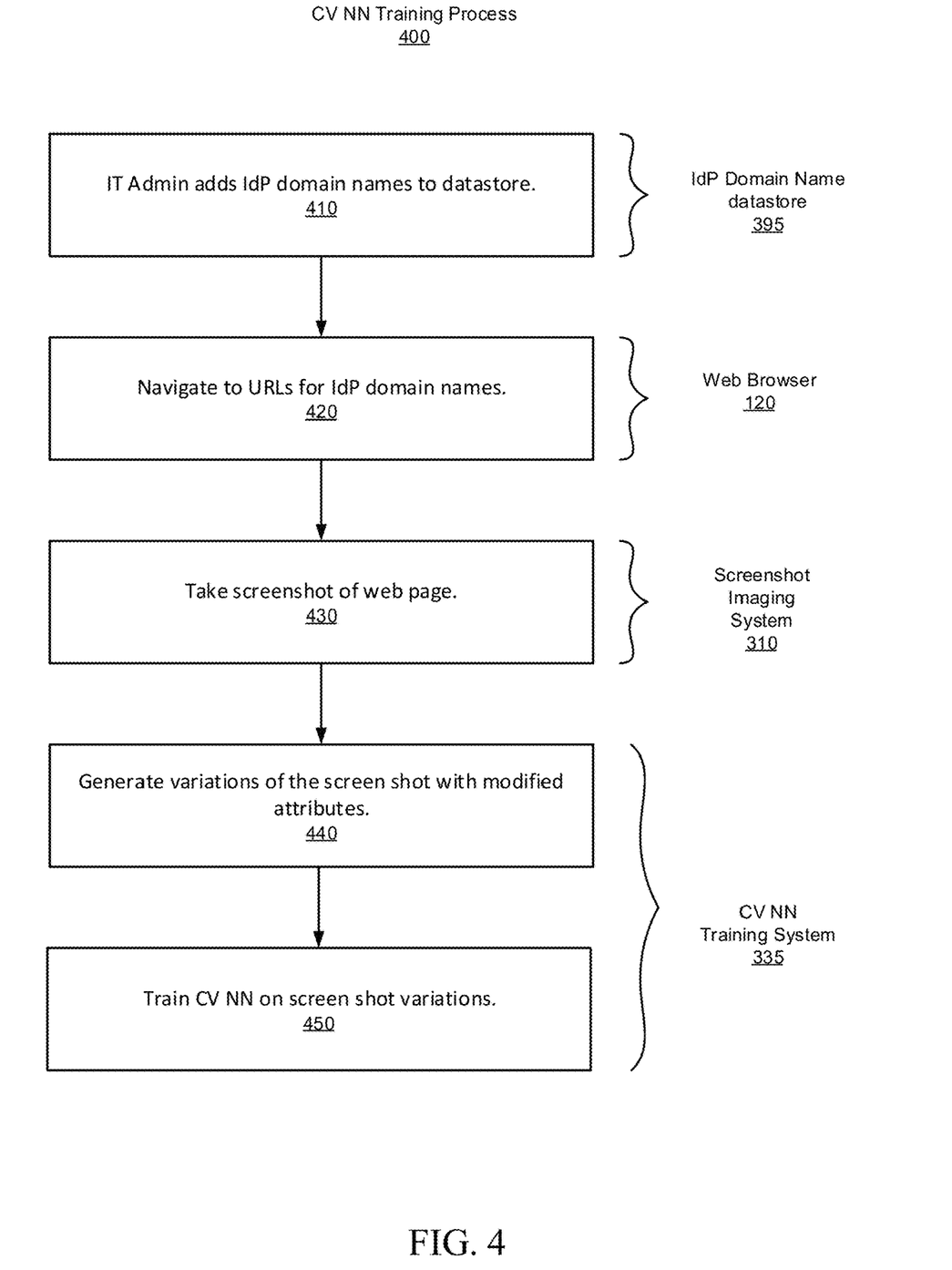
FIG. 4 is a flow diagram of a process for training a computer vision neural network, in accordance with an example of the present disclosure.

FIG. 4 is a flow diagram of a process 400 for training the CV neural network image analyzer 330, for example by CV neural network training system 335, of FIG. 3, in accordance with an example of the present disclosure.

The process 400 starts at operation 410, with the creation (or update and maintenance) of an IdP domain name datastore 395, of FIG. 3. In some examples, the IDP domain names are provided by an administrator of the system.

Next, at operation 420, the web browser 120, of FIG. 1, navigates to the web page specified by a URL associated with the IdP domain name. At operation 430, screenshot imaging system 310, of FIG. 3, captures a screenshot of the IdP web page.

At operation 440, the training system 335 generates variations of the screenshot by modifying attributes of the image to create data that will be used to train, test, and validate the neural network 330. In some examples, the attributes include one or more of background colors, logos (e.g., 240 of FIG. 2), fonts, dimensions, words and phrases (e.g., 230 of FIG. 2), as well as the language in which those words are presented (e.g., English, Spanish, etc.), although many other attribute variations are possible. K-fold cross validation method can be employed to estimate the skill of machine learning models.

At operation 450, the training system 335 trains the CV neural network image analyzer on the training data set using any suitable training procedure in light of the present disclosure. In some examples, the training may utilize Azur Cognitive Services.

In some examples, the CV neural network may be implemented using available architectures such as LeNet, AlexNetm GoogLeNet, VGGNet, or ResNet. In some examples, CV neural network may be implemented as a custom neural network comprising various convolutional layers and hidden layers.

In some examples, the trained CV neural network may be validated using K-fold cross validation to estimate the performance of the machine learning model. Additionally, the network may be tested using various hyper parameters to optimize the model.

After training, the CV neural network is made available to be downloaded by the client (e.g., the user device running the Web browser 120) for deployment in the phishing protection system 170.

Figure 5:
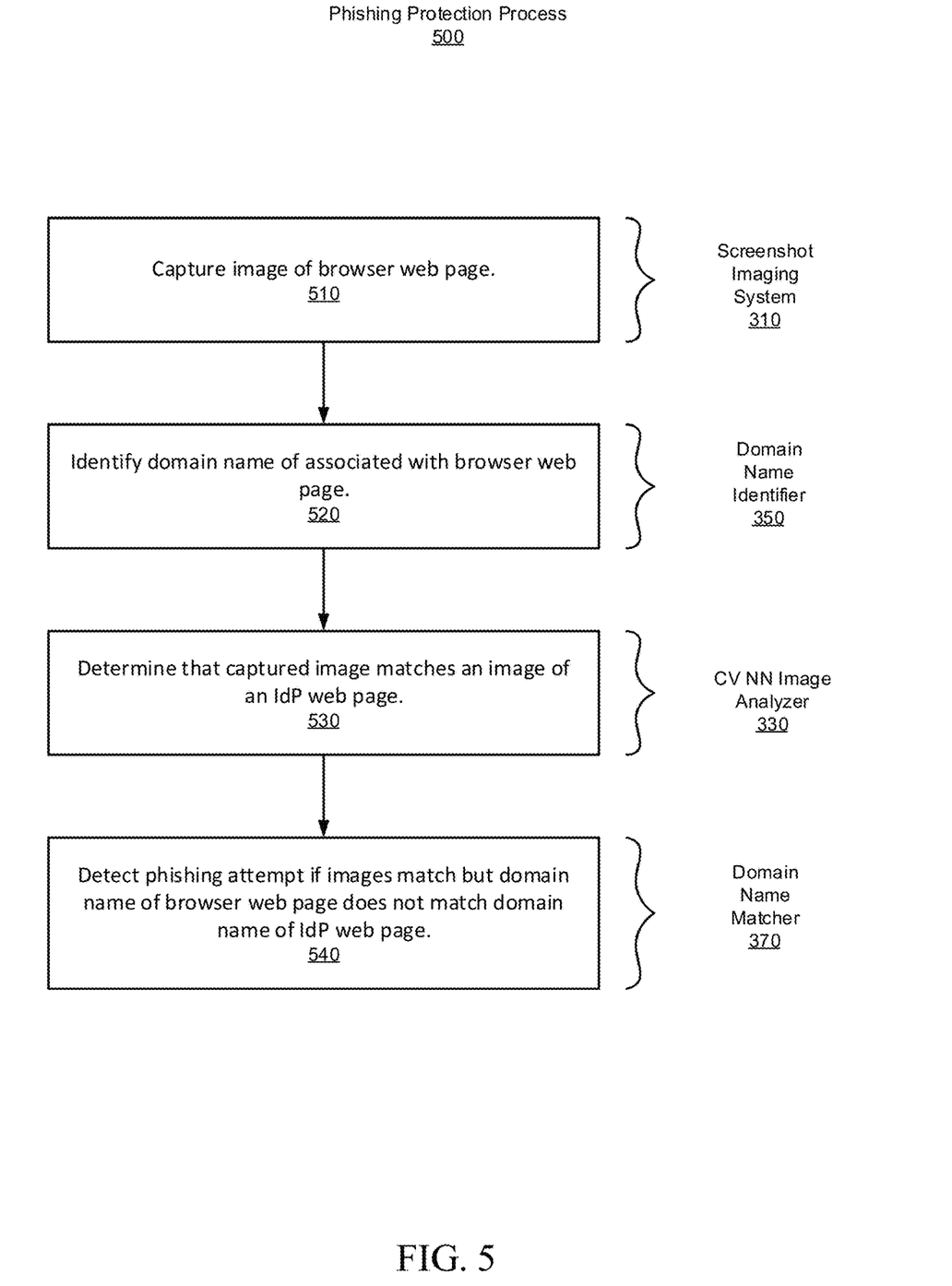
FIG. 5 is another flow diagram of a process for providing protection against phishing attacks, in accordance with an example of the present disclosure.

FIG. 5 is a flow diagram of another process 500 for providing protection against phishing attacks, executed by phishing protection system 170, of FIG. 1, or the subcomponents thereof, in accordance with an example of the present disclosure.

The process 500 starts at operation 510, with the screenshot imaging system 310, of FIG. 3, capturing an image of a browser web page to which the user has navigated.

Next, at operation 520, the domain name identifier 350, of FIG. 3, identifies the domain name of the web page.

At operation 530, the CV neural network image analyzer 330, of FIG. 3, determines whether or not the captured web page image matches the image of an IdP web page.

At operation 540, the domain name matcher of 370, of FIG. 3, detects a phishing attempt if the captured web page image matches the image of the IdP web page but the domain name associated with the browser web page differs from the domain name associated with the IdP web page.

In some examples, an initial determination is made that the browser web page is a sign-in page (e.g., though detection of a user ID and/or password field). If the web page is not a sign-in page, then the process for protection against phishing attacks is not necessary and can be bypassed.

In some examples, a security action is performed in response to the detected phishing attempt. Security actions may include one or more of warning the user, logging the detected phishing attempt, and generating an alert to an administrator.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Protection Against Theft of User Credentials

Figure 6:
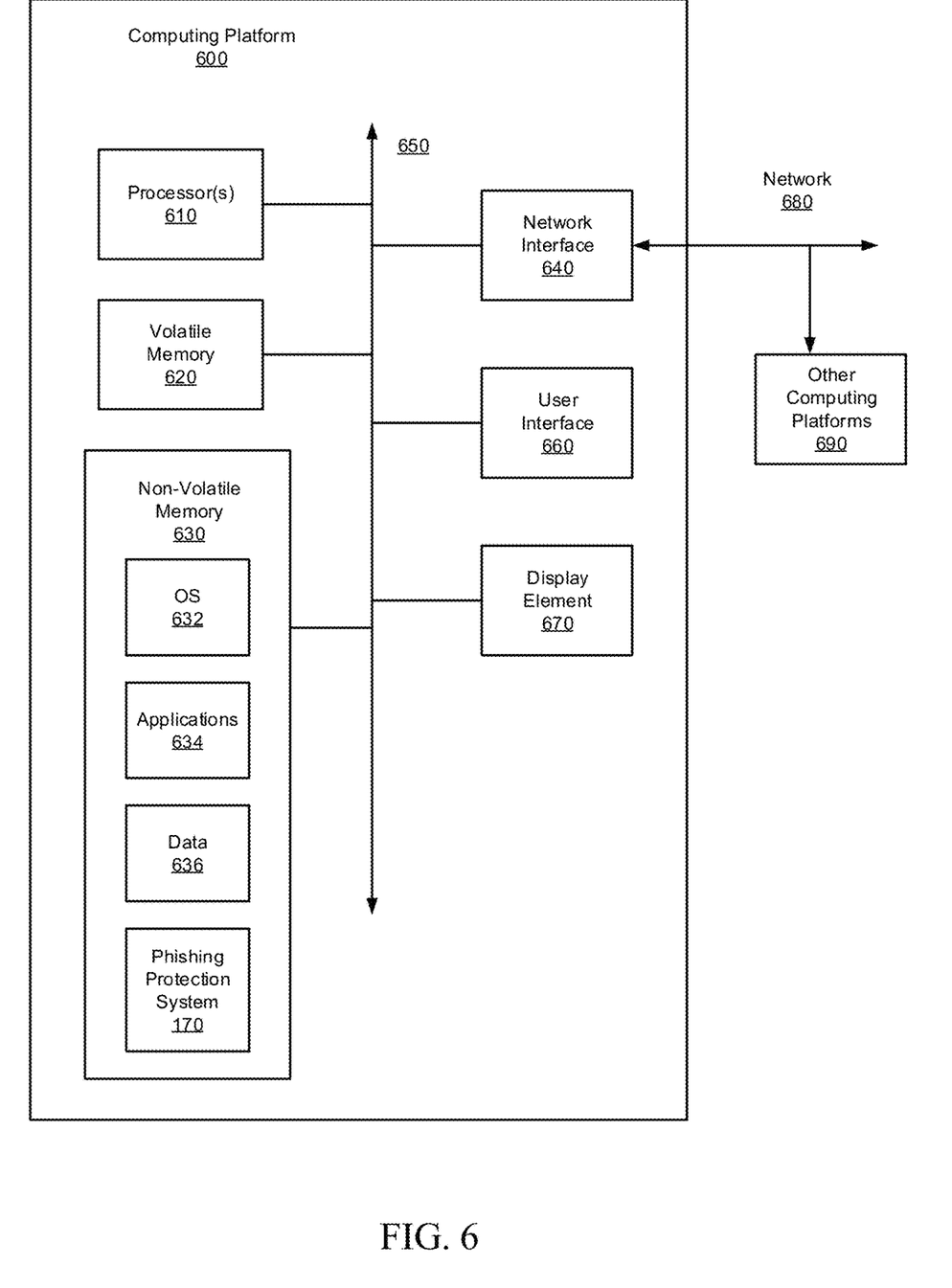
FIG. 6 is a block diagram of a computing platform configured to perform a process for providing protection against phishing attacks, in accordance with an example of the present disclosure.

FIG. 6 is a block diagram of a computing platform 600 configured to perform a process for providing protection against phishing attacks, in accordance with an example of the present disclosure. In some cases, the platform 600 may be a workstation, server, laptop, mobile device, or smartphone.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634 (including web browsers), data 636, and elements of phishing protection system 170 of FIG. 1, such that, for example, computer instructions of the operating system 632, the applications 634, and the elements of phishing protection system 170, are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
train a neural network, the training including:
navigating to an identity provider (IdP) web page based on a domain name associated with the IdP web page;
capturing an image of the IdP web page;
generating variations of the image of the IdP web page by modifying attributes of the image of the IdP, the attributes including one or more of a background color, logos, fonts, dimensions, languages, words, or phrases; and
employing the variations to train the neural network;
capture an image of a browser web page;
identify a domain name associated with the browser web page;
employ the neural network to determine an image match where the captured image matches the image of the IdP web page; and
detect a phishing attempt in response to the determination of the image match, if the domain name associated with the browser web page differs from the domain name associated with the IdP web page.

2. The computer system of claim 1, wherein the domain name associated with the IdP web page is obtained from a datastore of IdP web pages, the datastore configured by an administrator.

3. The computer system of claim 1, wherein the at least one processor is further configured to bypass the detection of the phishing attempt in response to a determination that the browser web page is not a sign-in page.

4. The computer system of claim 1, wherein the at least one processor is further configured to perform a security action in response to the detected phishing attempt, the security action including one or more of providing a warning to a device associated with a user who navigated to the browser web page, logging the detection, and generating an alert to an administrator.

5. A method for protection of user credentials comprising:
training, by a computer system, a neural network, the training including:

navigating to an identity provider (IdP) web page based on a second domain name associated with the IdP web page;

capturing an image of the IdP web page;

generating variations of the image of the IdP web page by modifying attributes of the image of the IdP, the attributes including one or more of a background color, logos, fonts, dimensions, languages, words, or phrases; and employing the variations to train the neural network;

capturing, by the computer system, an image of a browser web page;

identifying, by the computer system, a first domain name associated with the browser web page;

employing, by the computer system, the neural network to determine that the captured image matches an image of the IdP web page;

determining, by the computer system, that the first domain name differs from the second domain name; and detecting, by the computer system, a phishing attempt in response to the determination that the captured image matches the image of the IdP web page and the determination that the first domain name differs from the second domain name.

6. The method of claim 5, wherein the second domain name is obtained from a datastore of IdP web pages, the datastore configured by an administrator.

7. The method of claim 5, further comprising bypassing the detection of the phishing attempt in response to a determination that the browser web page is not a sign-in page.

8. The method of claim 5, further comprising performing a security action in response to the detected phishing attempt, the security action including one or more of providing a warning to a device associated with a user who navigated to the browser web page, logging the detection, and generating an alert to an administrator.

9. A non-transitory computer readable medium storing executable sequences of instructions to provide protection of user credentials, the sequences of instructions comprising instructions to:

train a neural network, the training including:

navigating to an identity provider (IdP) web page based on a domain name associated with the IdP web page;

capturing an image of the IdP web page;

generating variations of the image of the IdP web page by modifying attributes of the image of the IdP, the attributes including one or more of a background color, logos, fonts, dimensions, languages, words, or phrases; and employing the variations to train the neural network;

capture an image of a browser web page;

identify a domain name associated with the browser web page;

employ the neural network to determine an image match where the captured image matches the image of the IdP web page; and detect a phishing attempt in response to the determination of the image match, if the domain name associated with the browser web page differs from the domain name associated with the IdP web page.

10. The computer readable medium of claim 9, wherein the domain name associated with the IdP web page is obtained from a datastore of IdP web pages, the datastore configured by an administrator.

11. The computer readable medium of claim 9, wherein the sequences of instructions further include instructions to bypass the detection of the phishing attempt in response to a determination that the browser web page is not a sign-in page.

12. The computer readable medium of claim 9, wherein the sequences of instructions further include instructions to perform a security action in response to the detected phishing attempt, the security action including one or more of providing a warning to a device associated with a user who navigated to the browser web page, logging the detection, and generating an alert to an administrator.

* * * * *